(12) United States Patent  (10) Patent No.: US 9,383,631 B2
Jackson et al.  (45) Date of Patent: Jul. 5, 2016

(54) CAMERA CARRYING AND MOUNTING SYSTEM

(71) Applicants: Joseph Walter Jackson, Wilmington, DE (US); Andrew Douglas Johnson, Wilmington, DE (US)

(72) Inventors: Joseph Walter Jackson, Wilmington, DE (US); Andrew Douglas Johnson, Wilmington, DE (US)

(73) Assignee: ASFERIK, LLC, Wilmington, DE (US)

( * ) Notice: Subject to any disclaimer, the term of this patent is extended or adjusted under 35 U.S.C. 154(b) by 0 days.

(21) Appl. No.: 14/743,509

(22) Filed: Jun. 18, 2015

(65) Prior Publication Data

US 2015/0370149 A1  Dec. 24, 2015

Related U.S. Application Data

(60) Provisional application No. 62/013,951, filed on Jun. 18, 2014.

(51) Int. Cl.
*G03B 17/56* (2006.01)

(52) U.S. Cl.
CPC .................... *G03B 17/561* (2013.01)

(58) Field of Classification Search
CPC ............... G03B 17/56; G03B 17/561
See application file for complete search history.

(56) References Cited

U.S. PATENT DOCUMENTS

| 3,704,537 | A | 12/1972 | McKinzie |
| 3,762,616 | A | 10/1973 | Brunstetter |
| 4,091,402 | A * | 5/1978 | Siegel ............... G03B 17/56 362/3 |
| 4,209,157 | A | 6/1980 | Edmisten |
| 4,328,917 | A | 5/1982 | Reeberg |
| 4,386,724 | A | 6/1983 | Kotler |
| 4,454,675 | A | 6/1984 | Ives |
| 4,505,012 | A | 3/1985 | Johnson |
| 4,841,658 | A | 6/1989 | Katsenes |
| 5,067,267 | A | 11/1991 | Ives |
| 5,517,839 | A | 5/1996 | Parsons |
| 5,692,654 | A | 12/1997 | Bell |
| D444,201 | S | 6/2001 | Norris, Sr. |
| 6,354,034 | B1 | 3/2002 | Norris, Sr. |
| 6,536,154 | B1 | 3/2003 | Norris |
| 6,791,770 | B2 * | 9/2004 | Yamazaki ............... G02B 7/02 359/819 |
| 7,654,027 | B1 | 2/2010 | Grover |
| 7,654,028 | B1 | 2/2010 | Grover |
| 7,866,899 | B2 | 1/2011 | Kope et al. |

(Continued)

FOREIGN PATENT DOCUMENTS

EP  1 160 499  5/2001
JP  2004-320695  11/2004

OTHER PUBLICATIONS

US 1885 Carbine Sling, http://www/rollanet.org/stacyw/us_1885_carbine_sling.htm (last visited Sep. 15, 2014).

(Continued)

*Primary Examiner* — W B Perkey
(74) *Attorney, Agent, or Firm* — Finnegan, Henderson, Farabow, Garrett & Dunner, L.L.P.

(57) ABSTRACT

Embodiments of the present disclosure include a camera carrying and mounting system. The system may include a camera plate configured to mount onto a camera, a carrying structure, and a coupling mechanism coupled to the camera plate and configured to releasably engage the carrying structure to the camera plate. The camera plate may be configured to secure the camera to a camera stand with the coupling mechanism remaining coupled to the camera plate.

20 Claims, 15 Drawing Sheets

(56) References Cited

U.S. PATENT DOCUMENTS

| | | | |
|---|---|---|---|
| 8,047,729 B2 | 11/2011 | Kope et al. | |
| 8,678,678 B2* | 3/2014 | Imura | G03B 17/14 396/419 |
| 8,727,642 B1* | 5/2014 | Tse | F16M 11/041 396/419 |
| 2008/0061009 A1 | 3/2008 | Muse et al. | |
| 2011/0017896 A1* | 1/2011 | Bordignon | F16M 1/04 248/310 |
| 2012/0043360 A1 | 2/2012 | Kope et al. | |
| 2013/0193294 A1* | 8/2013 | Li | F16M 11/041 248/371 |
| 2013/0256484 A1* | 10/2013 | Kessler | G03B 17/561 248/224.7 |
| 2014/0050468 A1 | 2/2014 | Henry et al. | |
| 2014/0093230 A1* | 4/2014 | Hale | F16M 13/04 396/423 |
| 2014/0158845 A1* | 6/2014 | Fliger | F16M 11/041 248/309.1 |

OTHER PUBLICATIONS

Leica Goodies, http://wayback.archive.org/web/20051025004950/http://www.leicagoodies.com/ (last visited Jun. 18, 2015).

* cited by examiner

CAMERA CARRYING AND MOUNTING SYSTEM

CROSS-REFERENCE TO RELATED APPLICATION

This application claims the benefit of priority under 35 U.S.C. §119 to U.S. Provisional Patent Application No. 62/013,951, filed on Jun. 18, 2014, which is incorporated herein by reference in its entirety.

FIELD OF THE DISCLOSURE

Embodiments of the present disclosure include a camera carrying and mounting system, and more particularly, a camera carrying and mounting system including a mounting plate and a coupling mechanism for engaging and disengaging a carrying structure, such as a shoulder strap, belt, backpack strap, and the like.

BACKGROUND OF THE DISCLOSURE

Generally speaking, conventional cameras include structures for mounting to camera stands, such as a monopod or tripod. These structures include, for example, a threaded socket positioned on a base of the camera, which is configured to mate with a threaded element (e.g., a screw) of the camera stand. In certain applications, camera carrying mechanisms utilize the threaded socket of the camera for coupling a carrying structure, such as a shoulder strap, to the camera. The camera carrying mechanisms include, for example, a first structure having a threaded element to mate with the threaded socket of the camera base and a second structure having an engagement portion, such as, a hook or clip, for coupling to the carrying structure.

These camera carrying mechanisms, however, may have a number of shortcomings. For one, the carrying mechanism may be cumbersome for the camera user, particularly when the user takes photographs in a vertical (portrait) orientation. The coupling mechanism may interfere with the user when the user grips the base of the camera in the vertical shooting orientation. For example, the protruding geometry and hard edges of the coupling mechanism may cause discomfort and instability when a user grips the base of the camera for a vertical shot. The same issues arise in instances in which the coupling mechanism is engaged with a collar of a camera lens. Particularly, the protruding geometry of the coupling may cause discomfort when the user grasps the underside of the camera lens when attempting to stabilize the camera lens. These discomforts may lead to user fatigue and decreased steadiness of the camera, which ultimately may result in lower quality photographs.

In addition, existing camera carrying mechanisms may be inconvenient when the user desires to use a camera stand, as the user would need to disengage the carrying mechanism from the threaded socket of the camera before mounting the camera to the stand. And if the user desires to employ a camera stand having releasable clamps, the user may also be required to install a separate stand plate to the camera for engaging with the the releasable clamps of the camera stand. The time needed to disengage the coupling mechanism in order to engage the camera to the camera stand may result in lost photographic opportunities, i.e., missing a chance for a critical picture.

The present disclosure is directed to improvements in the existing technology.

SUMMARY OF THE DISCLOSURE

In accordance with an embodiment, a camera carrying and mounting system may include a camera plate configured to mount onto a camera, a carrying structure, and a coupling mechanism coupled to the camera plate and configured to releasably engage the carrying structure to the camera plate. The camera plate may be configured to secure the camera to a camera stand with the coupling mechanism remaining coupled to the camera plate.

In accordance with another embodiment, a camera carrying and mounting system may include a camera plate configured to mount onto a camera and a coupling mechanism coupled to a first end of the camera plate. The camera plate may include a first end, a second end, and a mounting hole configured to receive a first fastening element to mount the camera plate to the camera, and the mounting hole may be positioned between the first end and the second end of the camera plate. The coupling mechanism may be configured to releasably engage a carrying structure to the camera plate.

In yet another embodiment, a camera plate may include a first end, a second end, a mounting structure between the first end and the second end and configured to mount the camera plate to a camera, and a tapered portion at the first end of the camera plate. The tapered portion may include a section of the camera plate decreasing in thickness towards a terminal end of the camera plate, and the camera plate may be configured to secure the camera to a camera stand

DETAILED DESCRIPTION

Reference will now be made in detail to the exemplary embodiments of the present disclosure described above and illustrated in the accompanying drawings.

Figure 1:
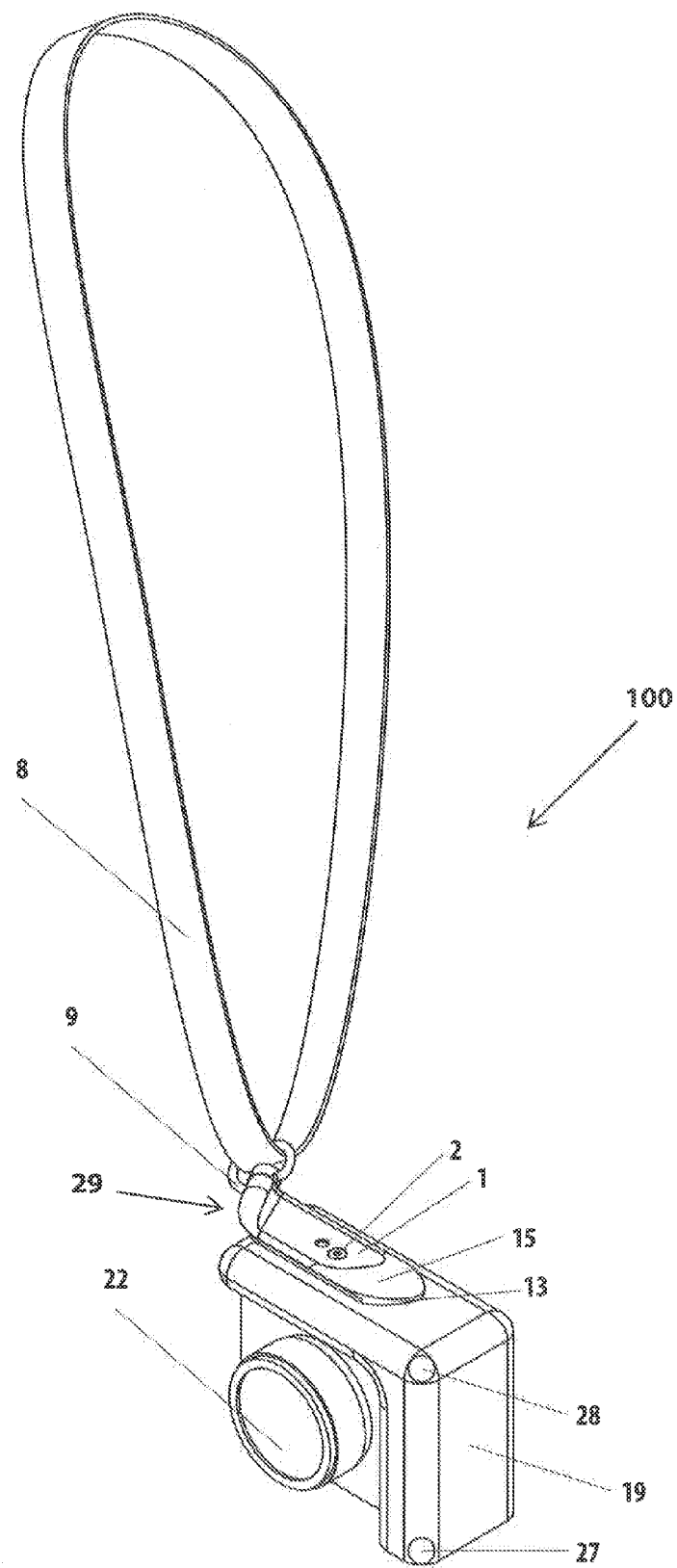
FIG. 1 illustrates a perspective view of a camera carrying and mounting system, according to an exemplary disclosed embodiment.

FIG. 1 illustrates a camera carrying and mounting system 100 coupled to a camera 19, according to an exemplary disclosed embodiment. As will be described in more detail below, camera carrying and mounting system 100 may include a camera plate 1 configured to mount onto camera 19 and a coupling mechanism 9 configured to readily engage and disengage a carrying structure 8, such as, for example, a shoulder strap, belt, backpack strap, and the like. Camera 19 may be any conventional camera known in the art. In certain embodiments, and as illustrated in FIG. 1, for example, camera 19 may include a first shutter release button 27, a second shutter release button 28, and a lens 22. First and second shutter release buttons 27, 28 may be conventional push-buttons on camera 19, each of which may be actuated by the user to take a photograph.

Figure 2:
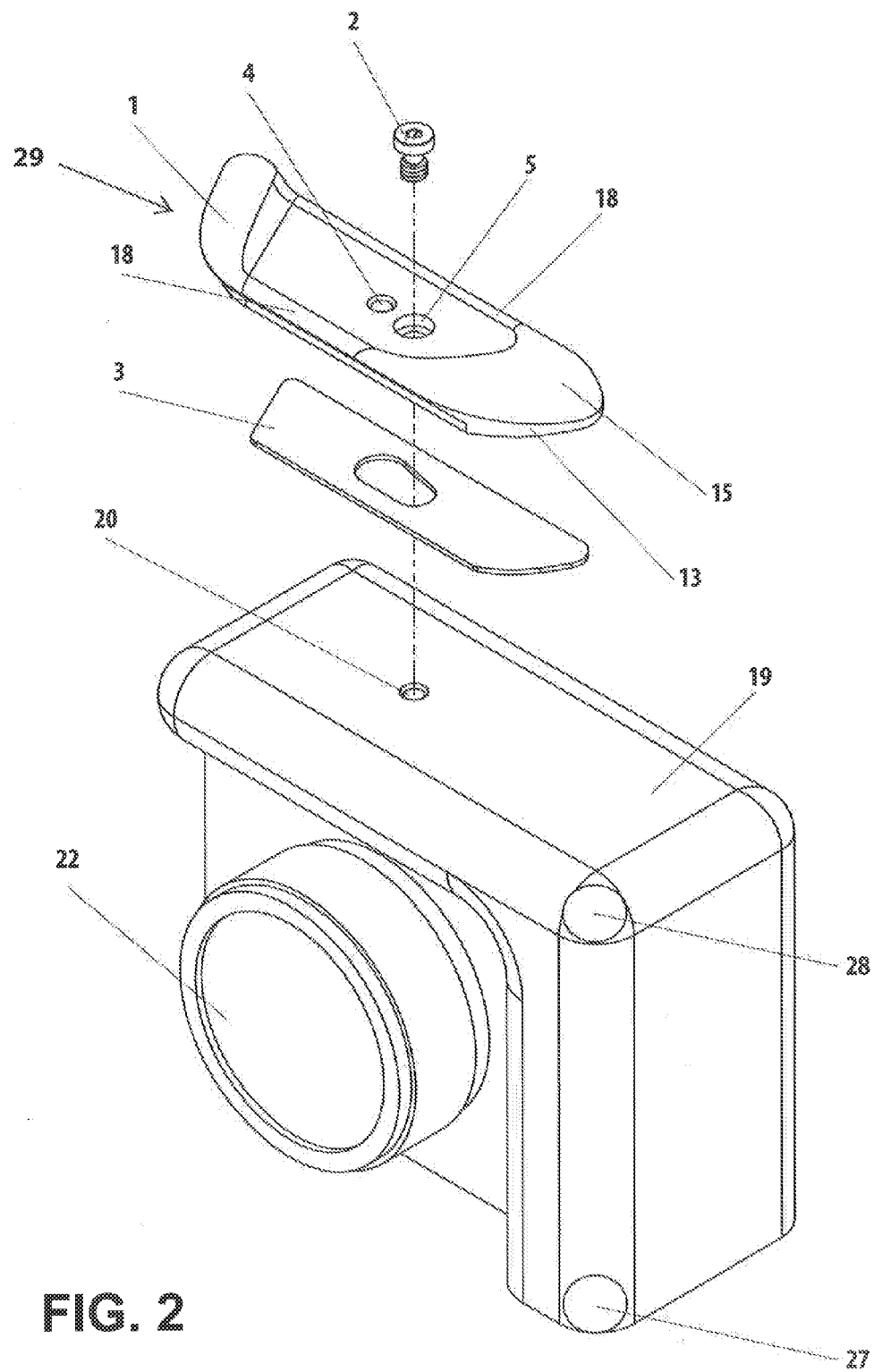
FIG. 2 illustrates a disassembled view of components of the camera carrying and mounting system, according to an exemplary disclosed embodiment.

FIG. 2 illustrates disassembled components of camera plate 1 relative to camera 19, according to an exemplary disclosed embodiment. As alluded to above, camera plate 1 may be configured to mount onto a base of camera 19. In particular, a fastening element 2, such as, for example, a threaded screw or any other suitable fastener, may couple camera plate 1 to the camera base by mating with a socket 20 positioned on a base of camera 19. In certain embodiments, socket 20 of camera 19 may be a conventional threaded socket configured to mate with a threaded element (e.g., a screw) of a camera stand, such as a monopod or tripod. As shown in FIG. 2, for example, camera plate 1 may include a counter-bored hole 5 through which fastening element 2 may pass for engaging socket 20 and mounting camera plate 1 to camera 19. Camera plate 1 may also include a bore 4 adjacent to counter-bored hole 5. Bore 4 may facilitate the mounting of camera 19 to any conventional camera strand, such as, for example, a monopod or a tripod. In certain embodiments, for example, bore 4 may be threaded and configured to mate with a threaded element (e.g., a screw) of the camera stand. In other embodiments, for example, bore 4 may be configured to receive an insert having a threaded bore for mating with the threaded element of the camera stand. It should also be appreciated that bore 4 may be positioned adjacent to hole 5 to allow camera 19 to be appropriately balanced over the camera stand. In addition, bore 4 may be centered relative to the peripheral edges of camera plate 1 to maximize surface contact between camera plate 1 and the camera stand for increased security and stability. In certain other embodiments, an insert having a threaded bore may be passed through hole 5 and into socket 20 of camera 19 to fasten camera plate 1 to camera 19. The threaded bore of the insert may be configured to engage with a threaded element of a camera stand, thereby obviating the need for bore 4.

In some embodiments, and as shown in FIG. 2, for example, camera plate 1 may include a gripping element 3 positioned on a face of camera plate 1 that is mounted to the base of camera 19. Gripping element 3 may include, for example, a rubber sheet or padding having ridges, and may be configured to cushion the interface between camera plate 1 and the base of camera 19 and also provide grip therebetween. The grip provided by gripping element 3 may be configured to resist and/or prevent movement between camera plate 1 and camera 19 when a user grasps and handles a base of camera 19.

Figure 3:
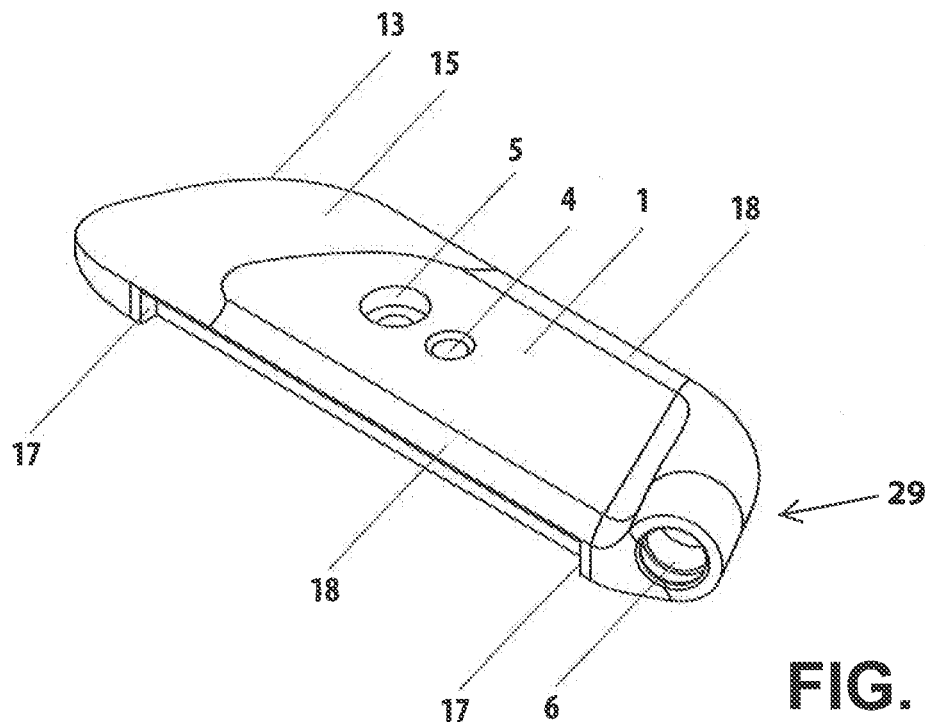
FIG. 3 illustrates a perspective view of a camera plate of the camera carrying and mounting system, according to an exemplary disclosed embodiment.
Figure 4:
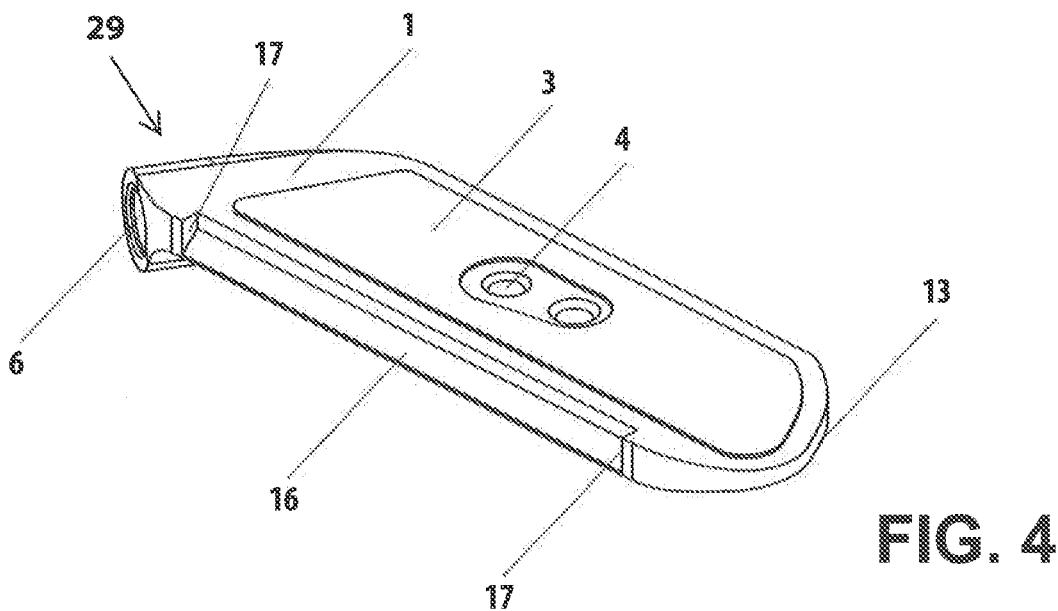
FIG. 4 illustrates a perspective view of the camera plate of the camera carrying and mounting system, according to an exemplary disclosed embodiment.

FIGS. 3 and 4 illustrate additional views of camera plate 1, according to an exemplary disclosed embodiment. FIG. 3 illustrates a view of a top side of camera plate 1. The top side of camera plate 1 may be the side of camera plate 1 that the user grasps when holding and handling the base of camera 19. FIG. 4 illustrates a view of a bottom side of camera plate 1. The bottom side of camera plate 1 may be the side of camera plate 1 that engages the base of camera 19. Camera plate 1 may further include a shoulder 29 onto which coupling mechanism 9 may be attached. In some embodiments, for example, shoulder 29 may include a channel 6 into which coupling mechanism 9 may be engaged and secured. Camera plate 1 may also include a first end and a second end, and bore 4 and counter-bored hole 5 may be positioned between the first and second ends.

Coupling mechanism 9 may be positioned at a first end of camera plate 1. For example, and with reference to FIG. 1, shoulder 29 may also be defined at the first end of camera plate 1, and coupling mechanism 9 may be engaged with camera plate 1 at shoulder 29. Moreover, in certain embodiments, shoulder 29 may be oriented at an angle relative to a longitudinal axis of camera plate 1. Accordingly, when the user grasps camera plate 1 at a base of camera 19, coupling mechanism 9 and strap 8 may not interfere with the user. Furthermore, by being positioned on an end of camera plate 1, shoulder 29 and coupling mechanism 9 may provide a more comfortable configuration for camera 19 when the user carries camera 19 with strap 8. For instance, the base of camera 19 may lie more vertically relative to the user's side when strap 8 is placed over the user's shoulder, resulting in a more compact configuration.

As shown in FIGS. 3 and 4, for example, camera plate 1 may also include an appropriate ergonomic shape, allowing a user to securely and comfortably grasp camera plate 1 when orienting camera 19 for vertical shooting. In some embodiments, the second end of camera plate 1 opposite the first end on which shoulder 29 is defined may be appropriately shaped to facilitate the user in securely and comfortably holding and handling camera plate 1, and thus camera 19. For example, the second end of camera plate 1 may include a truncated edge 13 angled toward a side of camera plate 1 opposite channel 6 of shoulder 29. That is, truncated edge 13 of camera plate 1 may face a direction away from coupling mechanism 9. As a result, and with reference to FIG. 7, truncated edge 13 may allow the user's index or shooting finger to more readily access and actuate second shutter release button 28 of camera 19. The second end of camera plate 1 may also include a tapered portion 15. Tapered portion 15 may define a section of camera plate 1, wherein a thickness of camera plate 1 decreases towards the terminal end of camera plate 1. As such, tapered portion 15 may form a surface on the top side of camera plate 1 that slopes toward the base of camera 19 when camera plate 1 is mounted to the camera base. Accordingly, and also with reference to FIG. 7, tapered portion 15 may provide an improved grip of camera plate 1, as tapered portion 15 may allow camera plate 1 to better conform to the shape of the user's hand. Camera plate 1 may also include a suitable material 18 on the peripheral edges of camera plate 1. Material 18 may be configured to provide improved grip and cushioning of camera plate 1 for the user, and may include, for example, a rubber or neoprene strip, or the like.

Figure 5:
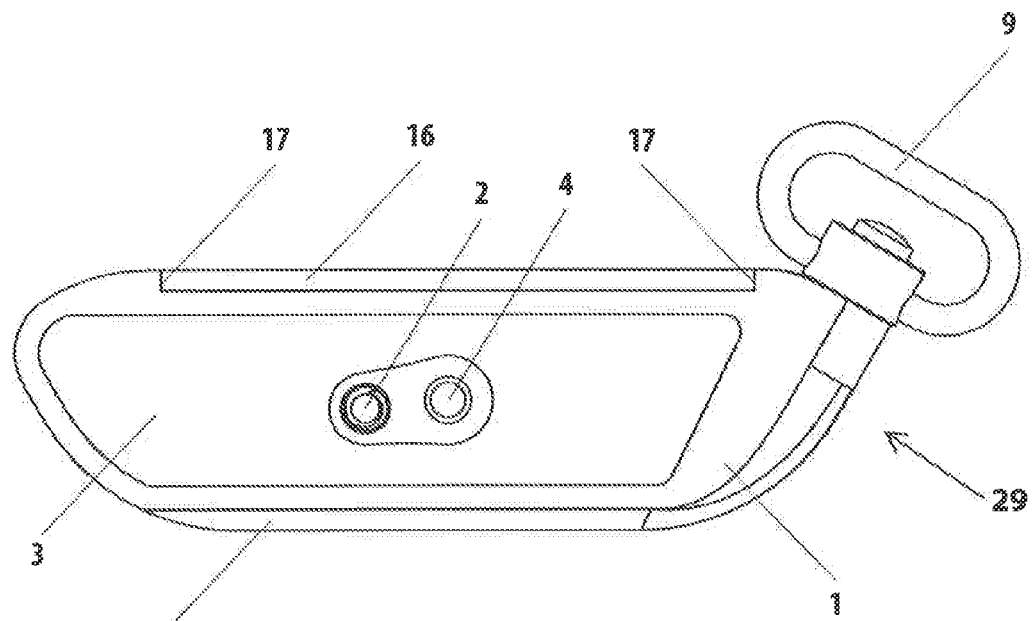
FIG. 5 illustrates a view of the camera plate and a coupling mechanism of the camera carrying and mounting system, according to an exemplary disclosed embodiment.
Figure 8:
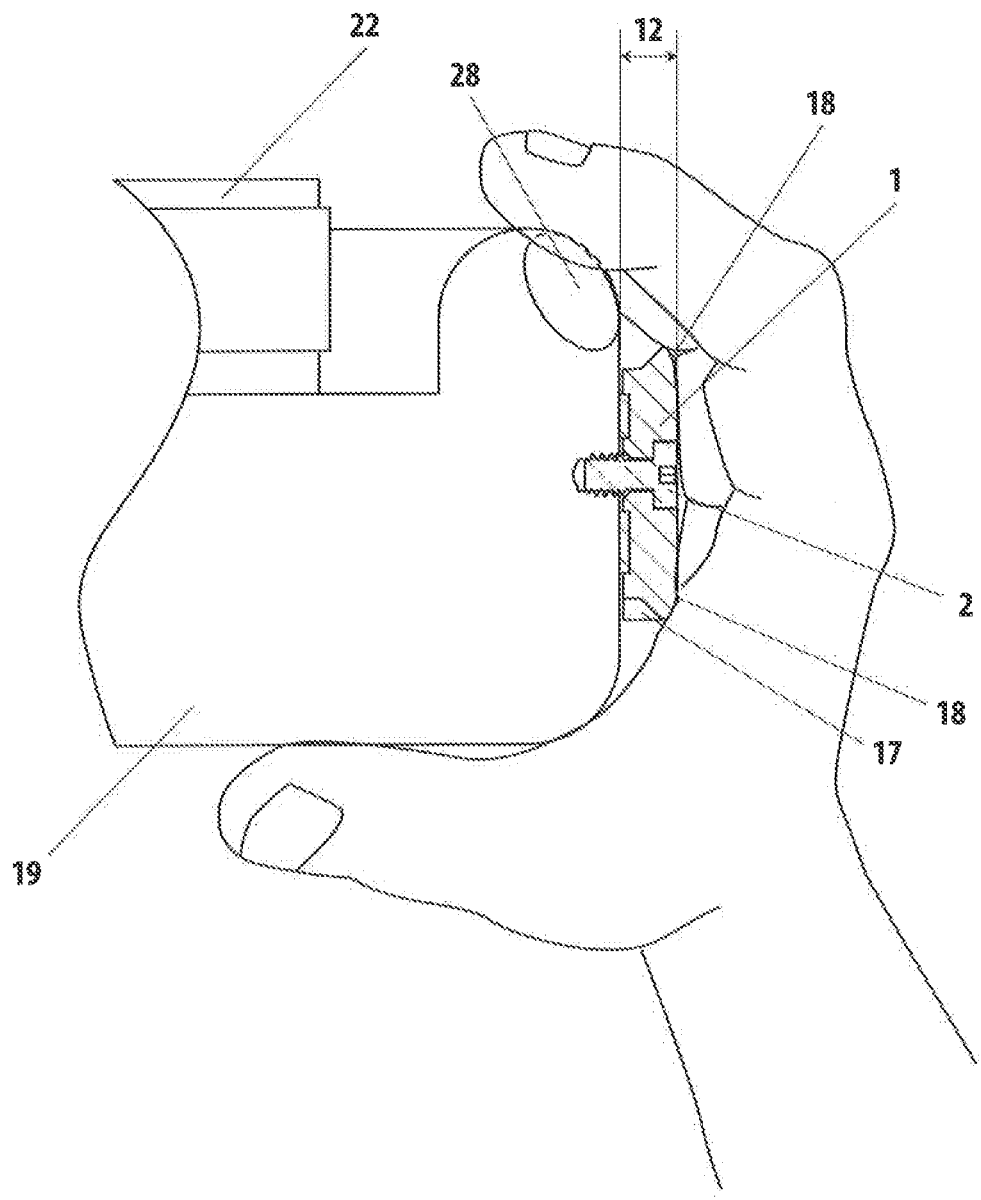
FIG. 8 illustrates a partial cross-sectional view of the camera carrying and mounting system, according to an exemplary disclosed embodiment.

In addition, and as shown in FIGS. 3, 5, and 8, for example, counter-bored hole 5 of camera plate 1 may be appropriately sized such that fastening element 2 may sit flush with the top surface of camera plate 1. For example, and with reference to FIG. 8, hole 5 may include a suitable depth such that the head of fastening element 2 may not extend beyond the top surface of camera plate 1. This feature may provide the benefit of a lower and flush profile 12 for camera plate 1, and thus the ability for the user to comfortably and securely grasp camera plate 1 and camera 19.

Figure 13:
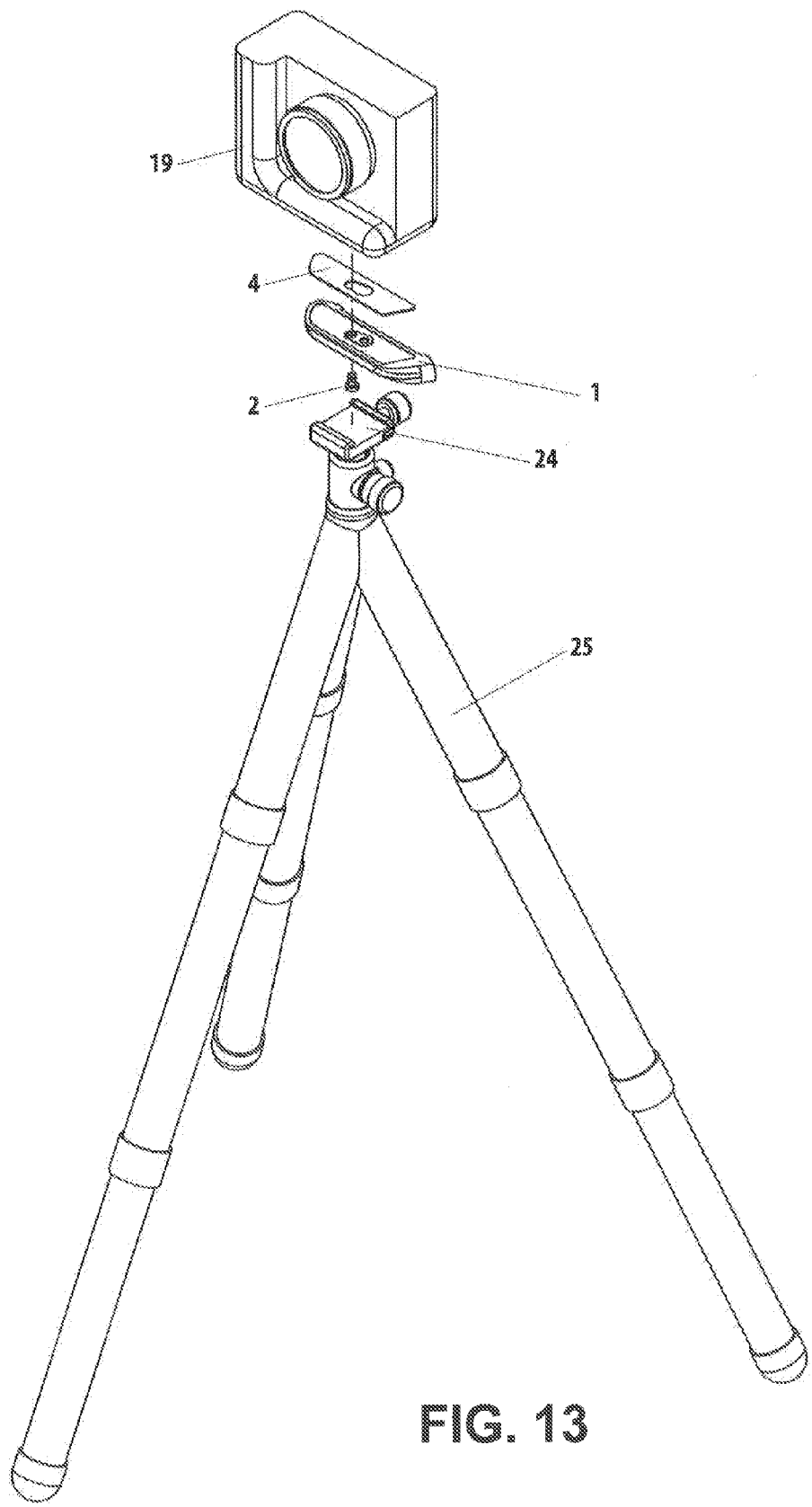
FIG. 13 illustrates a perspective view of a camera stand and components of the camera carrying and mounting system, according to an exemplary disclosed embodiment.
Figure 14:
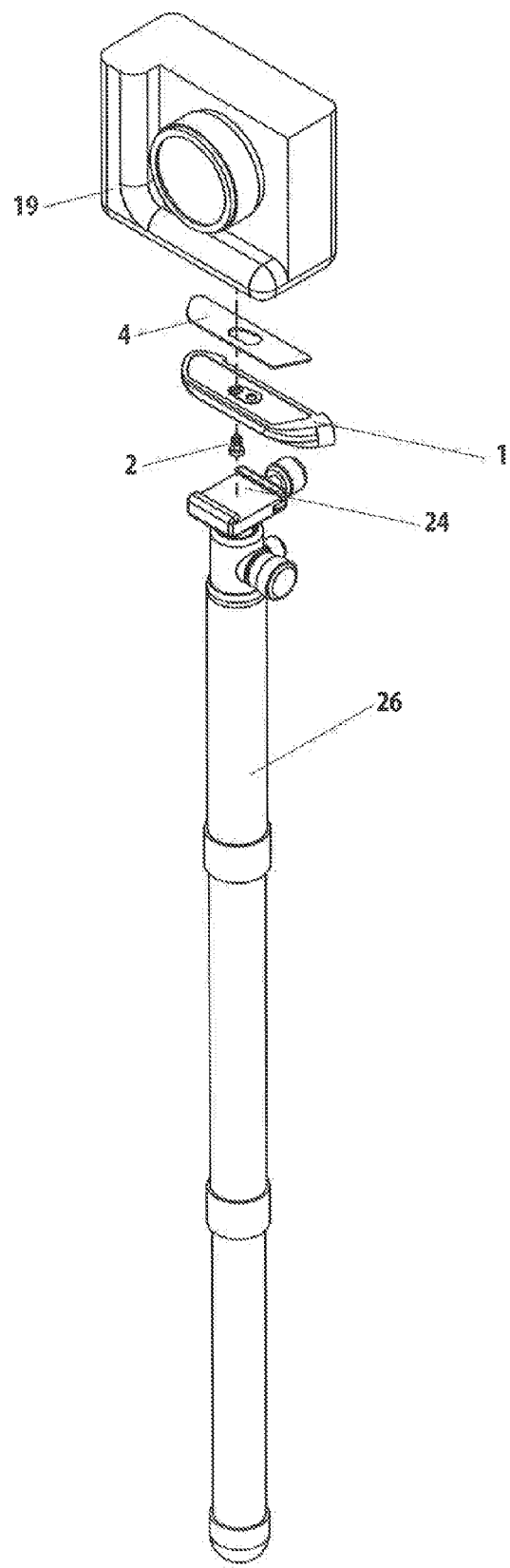
FIG. 14 illustrates a perspective view of another camera stand and components of the camera carrying and mounting system, according to an exemplary disclosed embodiment.
Figure 15:
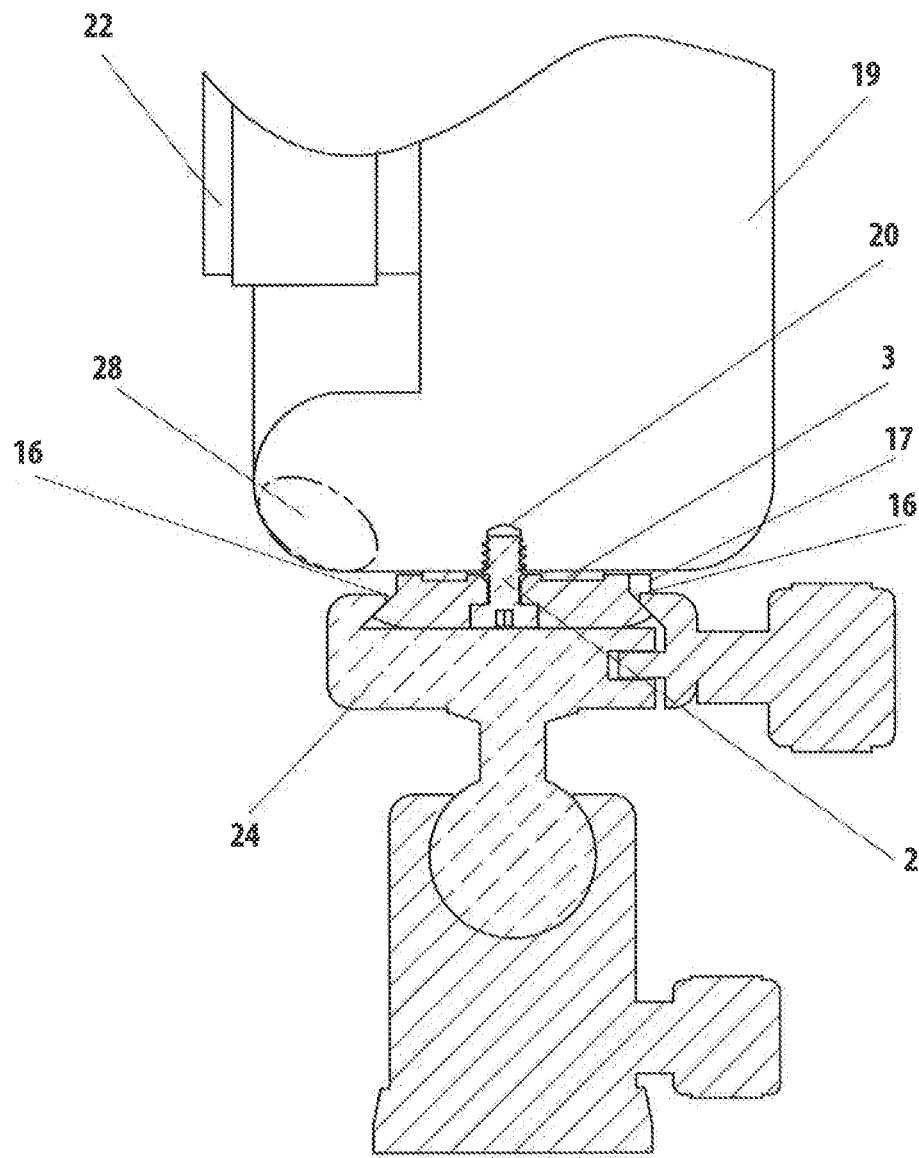
FIG. 15 illustrates a partial cross-sectional view of a portion of a camera stand and the camera carrying and mounting system, according to an exemplary disclosed embodiment.

Camera plate 1 may, additionally, or alternatively, include one or more bevels 16 and stops 17. As shown in FIGS. 3 and 4, for example, bevels 16 and stops 17 may be positioned on the bottom side of camera plate 1. Bevels 16 and stops 17 may be configured to facilitate mounting of camera 19 to other variations of camera stands, such as, for example, camera stands including quick release attachment mounts or clamps readily known in the art. For example, and with reference to FIGS. 13-15, bevels 16 of camera plate 1 may be defined on peripheral edges of camera plate 1 and may be configured to engage the arms a quick release clamp 24 of a camera stand, such as a tripod 25 (FIG. 13) or a monopod 26 (FIG. 14). In certain embodiments, camera plate 1 may include a width of 38 millimeters, and each bevel 16 may include a 45° dovetail configuration to mate with the releasable clamps of an Arca-Swiss style attachment mount. Accordingly, camera plate 1 of carrying and mounting system 100 may allow a user to readily engage and disengage camera 19 from numerous types of camera stands, including, for example, camera stands with a threaded element for installation and camera stands 25, 26 having release clamps 24 for installation. Carrying and mounting system 100 may also provide the ability to install camera 19 to these various camera straps without the need to disassemble carrying and mounting system 100 from the base of camera 19. In addition, camera plate 1 may allow coupling mechanism 9 and strap 8 to remain attached to camera plate 1 when mounting camera 19 to the camera stand. Such features obviate the need to dissemble components of carrying and mounting system 100, saving time for the user.

As alluded to above, camera plate 1 may also include stops 17 configured to prevent camera plate 1, and thus camera 19, from sliding off release clamp 24. It should be appreciated that stops 17 may be located at positions of camera plate 1 at which camera plate 1 has varying widths. Stops 17 may, for example, be located at a position at which a width of camera plate 1 is greatest. Such a feature may provide added security in situations in which clamp 24 is partially open because the arms of clamp 24 may still interfere with stops 17 should camera plate 1 begin to slide relative to clamp 24. It should further be appreciated that stops 17 may be appropriately spaced apart to accommodate any sized quick release attachment mounts or clamps known in the art.

Figure 6:
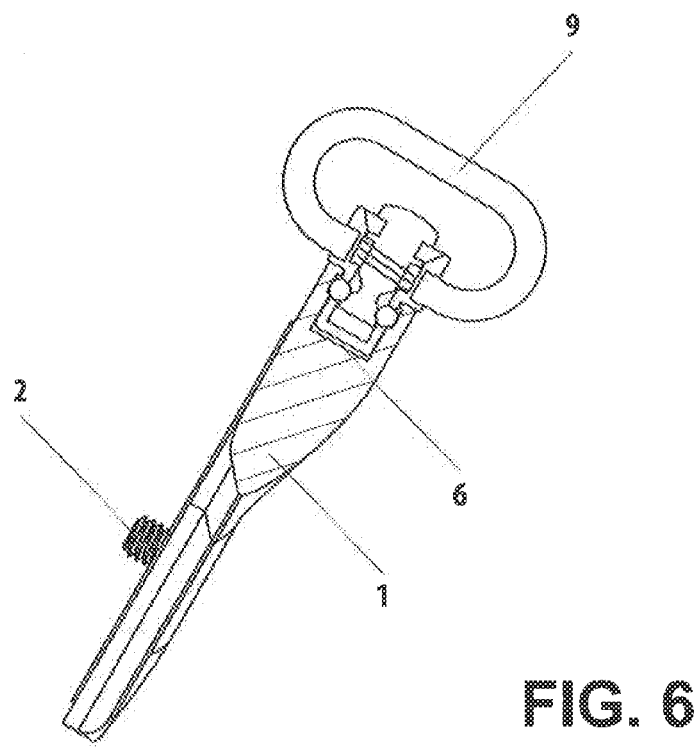
FIG. 6 illustrates a cross-sectional view of the camera plate and the coupling mechanism of the camera carrying and mounting system, according to an exemplary disclosed embodiment.

FIGS. 5 and 6 illustrate additional views of camera plate 1 and coupling mechanism 9, according to an exemplary disclosed embodiment. As discussed above, coupling mechanism 9 may be engaged and secured into channel 6 formed on shoulder 29 of camera plate 1. As shown in the cross-sectional view of FIG. 6, in some embodiments, coupling mechanism 9 may include an insertion portion configured to be inserted and secured in channel 6 and a releasable portion configured to engage and disengage from the insertion portion.

Figure 7:
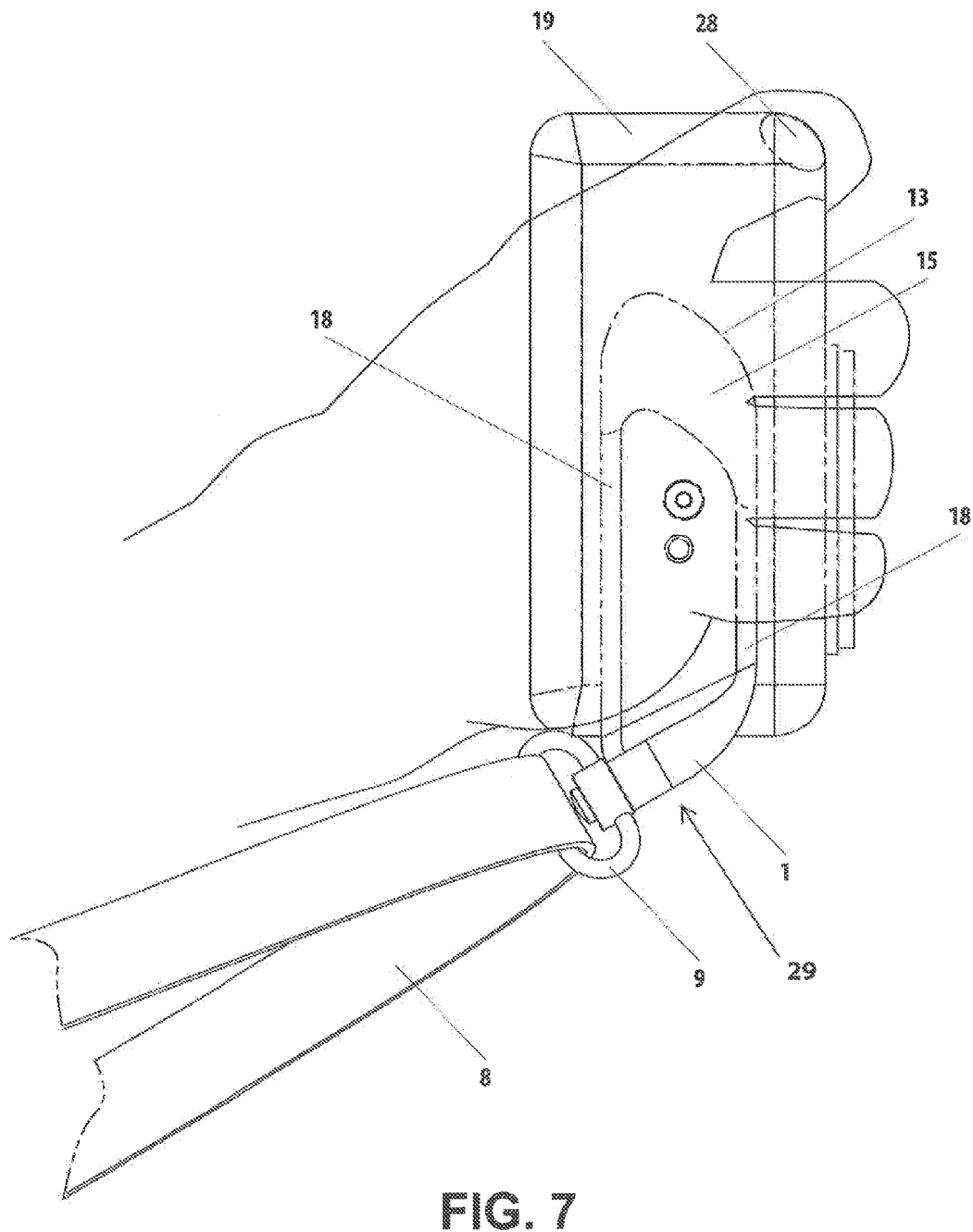
FIG. 7 illustrates a view of the camera carrying and mounting system, according to an exemplary disclosed embodiment.

Camera plate 1 may extend along a portion of the base of camera 19, as shown, for example, in FIG. 7. In other embodiments, camera plate 1 may extend along an entire length of the base of camera 19. It should be appreciated, however, that camera plate 1 may extend along any length of a base of camera 19 so long as camera plate 1 is appropriately sized to be gripped and handled by the user. In addition, camera plate 1 may also be appropriately sized such that shoulder 29 extends over a base of camera 19. Accordingly, a user may grasp camera plate 1 and a base of the camera 19 while avoiding encumbering contact with shoulder 29, coupling mechanism 9, and/or strap 8.

As is well known in the art, camera 19 may include a battery compartment (not shown). For embodiments in which a battery compartment of camera 19 may be positioned at a camera base, the feature of shoulder 29 extending over the base of camera 19 may avoid the undesired circumstance of coupling mechanism 9 and/or shoulder 29 interfering with the body of camera 19 when opening the battery compartment.

Figure 9:
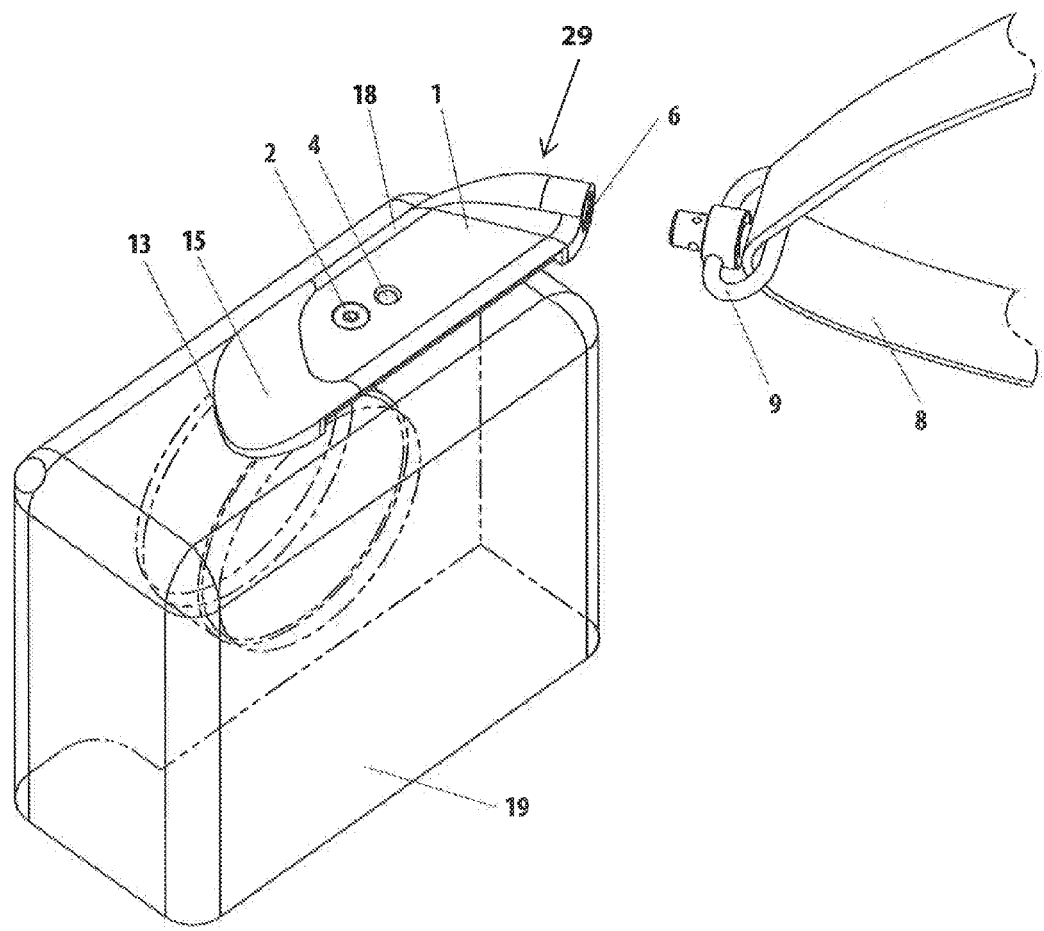
FIG. 9 illustrates a perspective view of the camera carrying and mounting system, according to an exemplary disclosed embodiment.

As discussed above, coupling mechanism 9 may be configured to readily engage and disengage strap 8 from camera plate 1, and thus camera 19. As shown in FIG. 9, coupling mechanism 9 may include for example, a push-button fastener as known in the art. In such an embodiment, the releasable portion of the push-button fastener may be configured to engage and disengage from an insertion portion of the push-button fastener. Moreover, the releasable portion may be configured to rotate and swivel relative to shoulder 29 when engaged with the insertion portion. It should be appreciated, however, that the camera carrying and mounting system of the present disclosure may incorporate a variety of suitable fasteners or mechanisms configured to release and secure strap 8 to camera plate 1.

Figure 10:
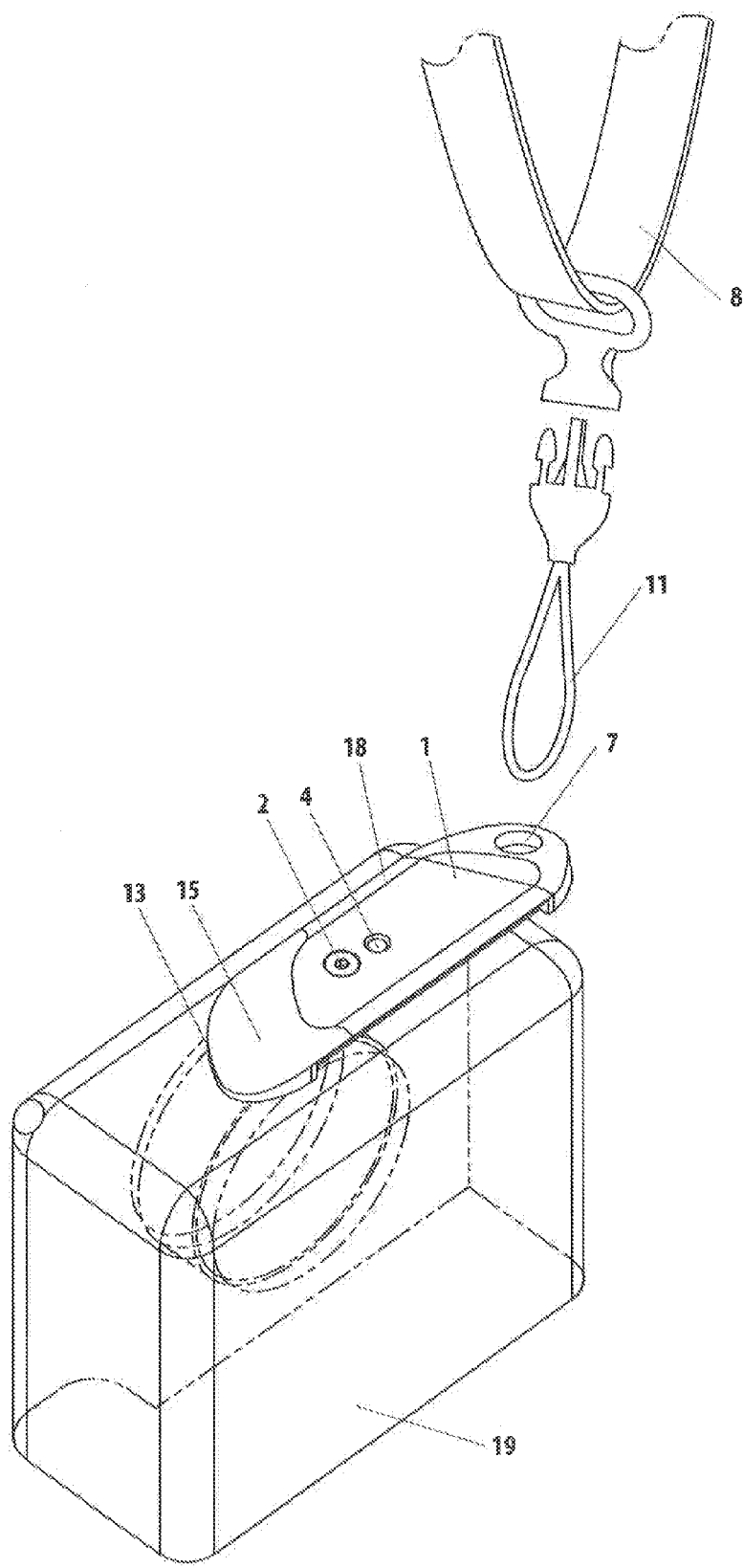
FIG. 10 illustrates a perspective view of the camera carrying and mounting system, according to an exemplary disclosed embodiment.

In one embodiment, and as shown in FIG. 10, the coupling mechanism may include a buckle-clip fastener. A cord 11 may be attached to a clip, and the strap 8 may be passed through a loop on a buckle. Cord 11 may be passed through an engagement section 7 of camera plate 1 to secure the clip thereto. It should be appreciated that engagement section 7 may include any suitable opening, aperture, hole, slit, slot, or loop structure configured to engage camera plate 1 with another structure.

Figure 11:
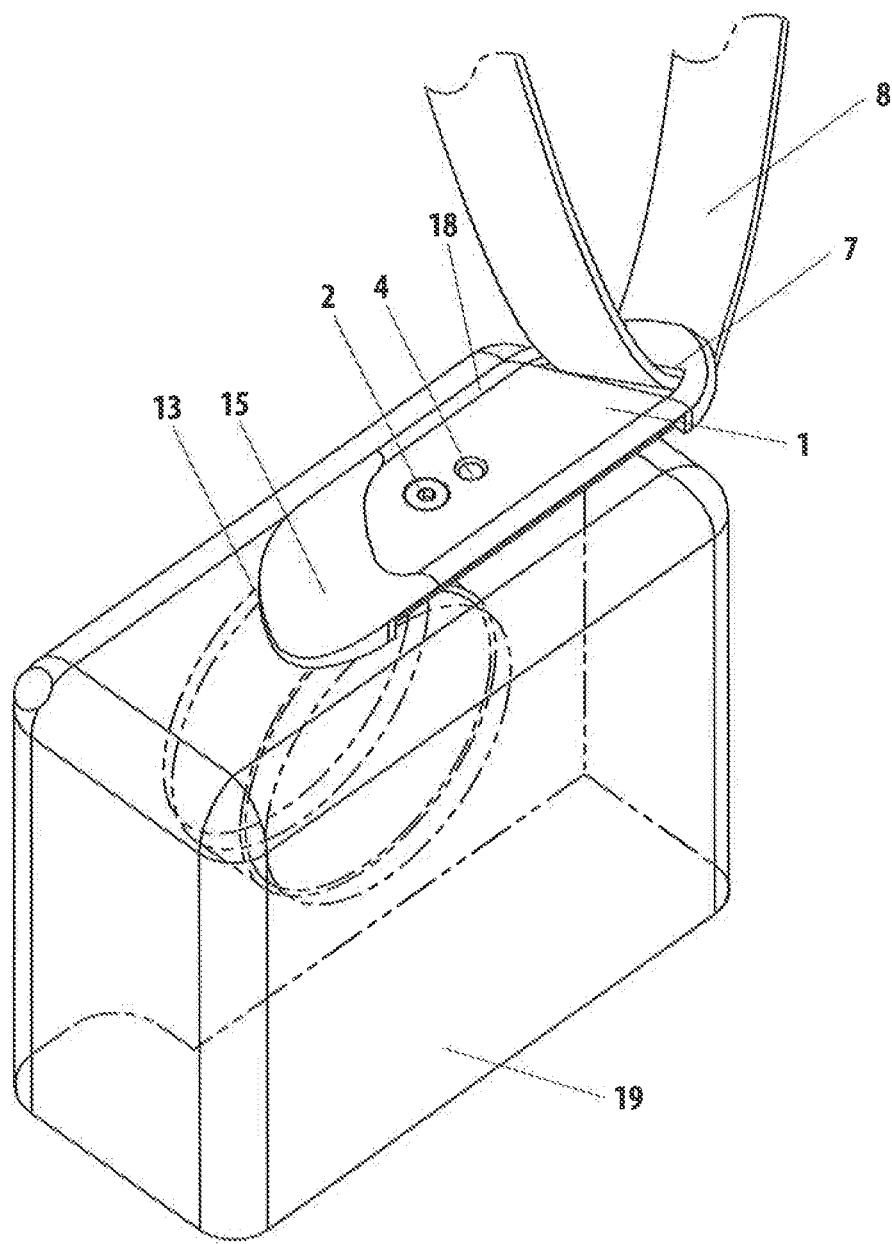
FIG. 11 illustrates a perspective view of the camera carrying and mounting system, according to an exemplary disclosed embodiment.

In another embodiment, and as shown in FIG. 11, the coupling mechanism may include a releasable arm. In such an embodiment, engagement section 7 may be a loop formed by the releasable arm through which strap 8 may be passed and secured. The releasable arm may be configured to secure and release strap 8 from camera plate 1. For example, the releasable arm may be configured to lock to close the loop around strap 8 and also configured to unlock and move relative to camera plate 1 to open the loop and allow disengagement of strap 8.

Figure 12:
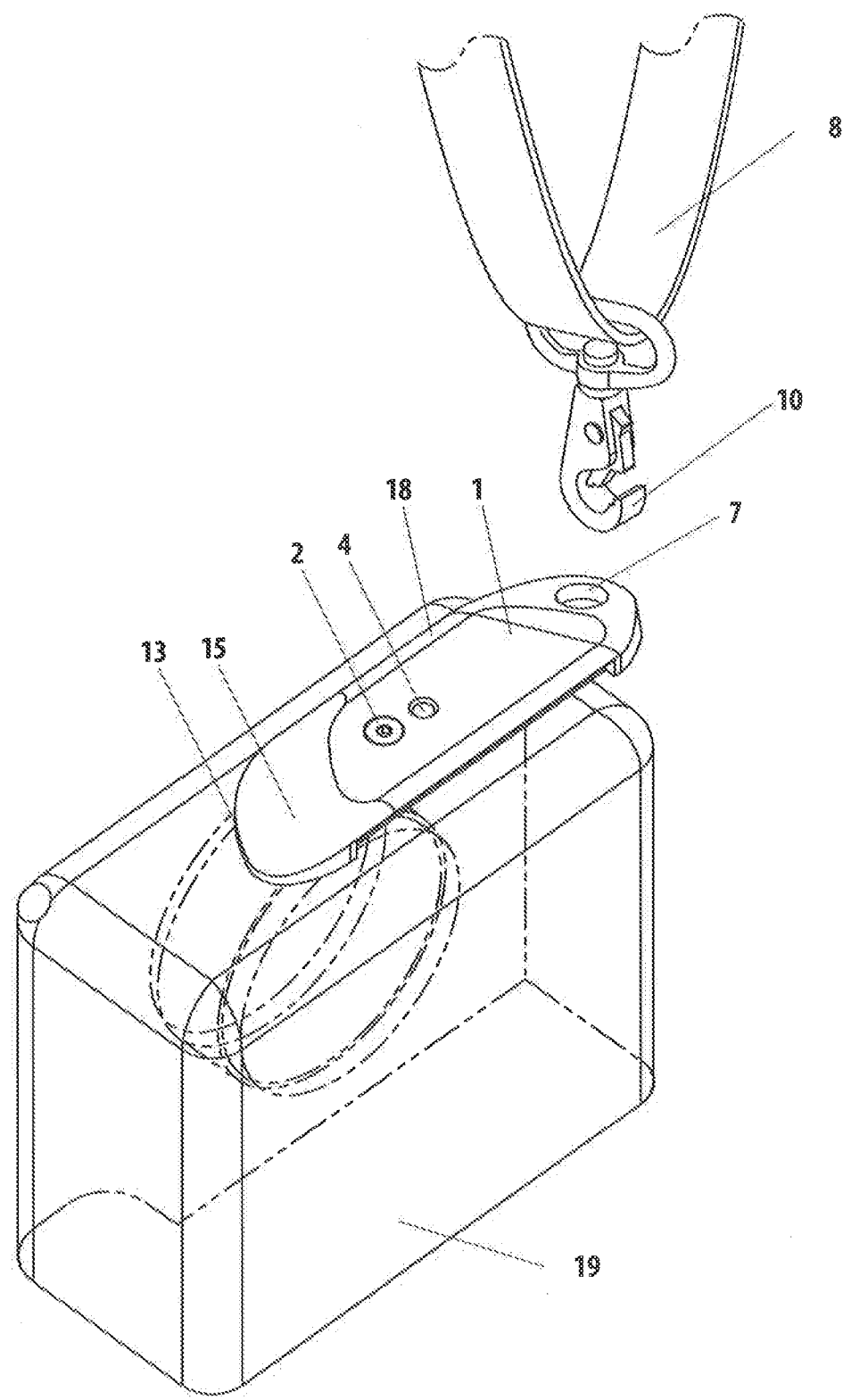
FIG. 12 illustrates a perspective view of the camera carrying and mounting system, according to an exemplary disclosed embodiment.

In yet another embodiment, and as shown in FIG. 12, the coupling mechanism may include a releasable hook fastener. Strap 8 may be passed through a loop on a releasable hook 10. Hook 10 may be configured to latch onto and release from engagement section 7 of camera plate 1 to secure and disengage strap 8 from camera plate 1.

Figure 16:
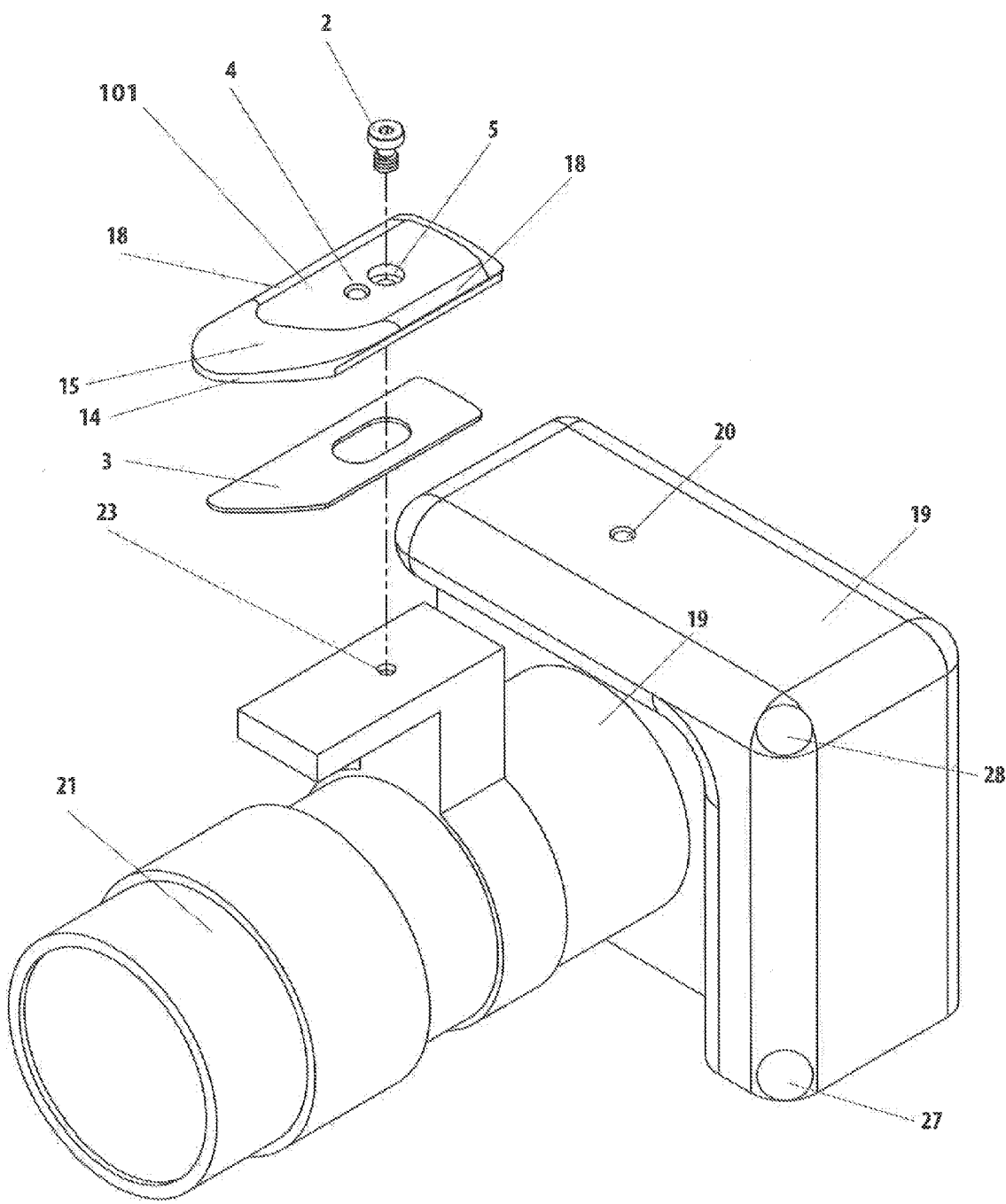
FIG. 16 illustrates a disassembled view of components of another camera carrying and mounting system, according to an exemplary disclosed embodiment.
Figure 17:
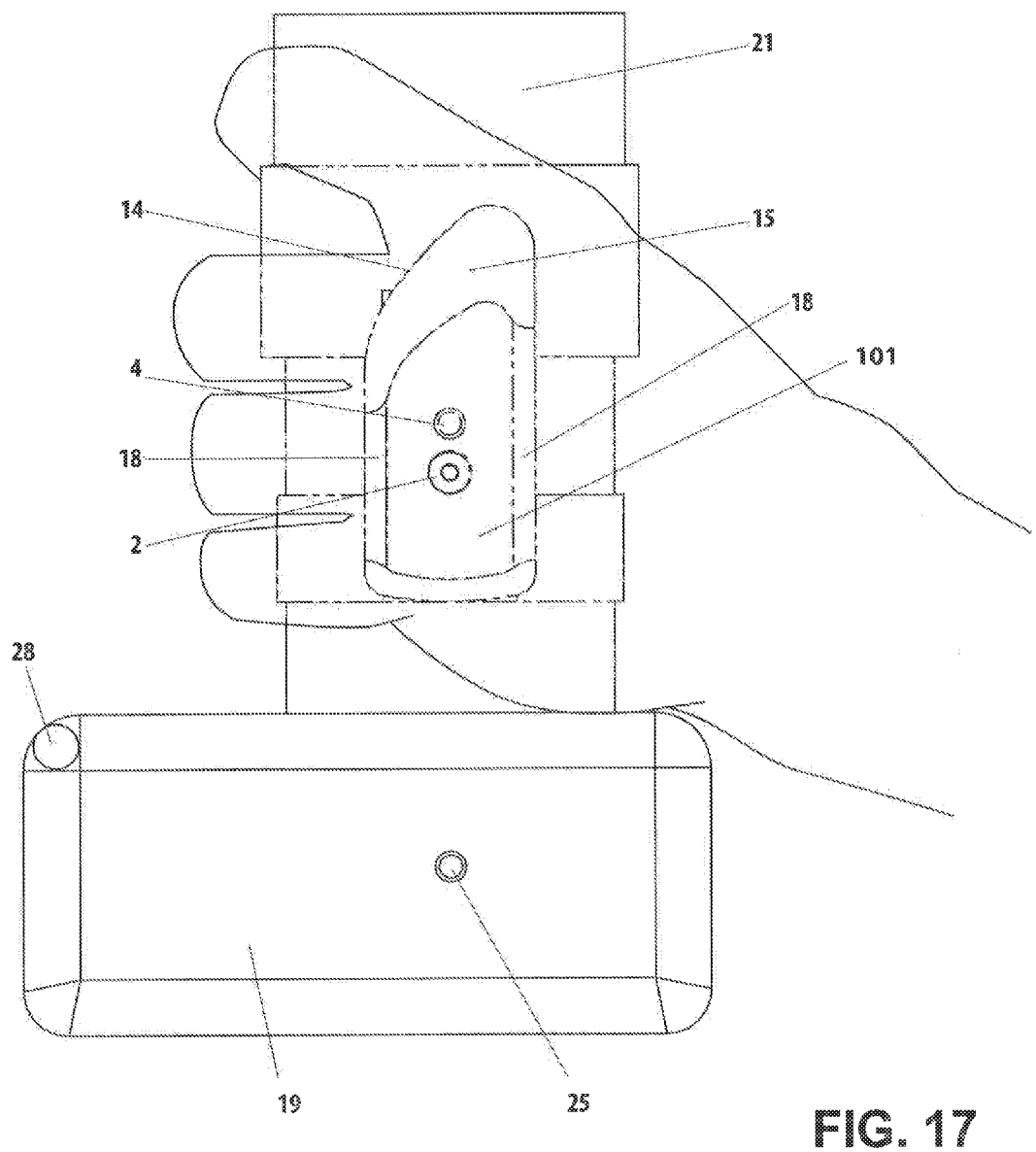
FIG. 17 illustrates a view of the camera carrying and mounting system of FIG. 16, according to an exemplary disclosed embodiment.

Although the above embodiments describe the camera carrying and mounting system engaged with a base of camera 19, it should also be appreciated that the carrying and mounting system may be engaged with any other suitable section of camera 19. For example, and as shown in FIGS. 16 and 17, the carrying and mounting system may be appropriately dimensioned and sized to engage with a stand socket 23 on a collar of a camera lens 21. In the embodiment of FIGS. 16 and 17, camera 19 may include a long camera lens 21, and in the embodiments of FIGS. 1-15, camera 19 may include a short camera lens 22. Similar to camera plate 1 disclosed above and in FIGS. 1-15, the embodiment of FIGS. 16 and 17 illustrate a camera plate 101 that may include a truncated edge 14 and tapered portion 15 configured to allow the user to more readily grasp camera plate 101 and camera lens 21. For example, and as shown in FIG. 17, truncated edge 14 may allow the user's index or active finger to more readily access and actuate camera lens 21. Moreover, and also with reference to FIG. 17, tapered portion 15 may provide an improved grip of camera plate 101, as tapered portion 15 may allow camera plate 101 to better conform to the shape of the user's hand as the user grasps camera plate 101 and camera lens 22. Although not shown in FIGS. 16 and 17, it should be appreciated that camera plate 101 may include a shoulder and a coupling mechanism as described above.

It should also be appreciated that the camera carrying and mounting system may be seamlessly integrated with camera 19. In one embodiment, camera plate 1 itself may form a base of camera 19, as opposed to being mounted (e.g., fastened or screwed) onto an existing camera base. Thus, as an example, for a camera 19 including a battery compartment on a camera base, the integrated camera plate 1 may act as a cover that opens and closes access to the battery compartment. In another embodiment, camera plate 101 may be integrally formed with a base of camera lens 21.

In some embodiments, camera plate 1, 101 may include alignment lines or similar features to ensure camera plate 1, 101 is installed perpendicular to the lens axis when mounted on camera 19 and in-line with the lens axis when mounted on the lens collar. The alignment features may also prevent an improperly tightened camera plate 1, 101 from accidentally rotating.

It should be appreciated that camera plate 1, 101 may be manufactured from plastic, metal, or any other suitably rigid material. In addition, camera plate 1, 101 may be manufactured by any suitable process, such as, for example, injection molding, die or investment casting, or machining.

As will be appreciated by one of ordinary skill in the art, the presently disclosed camera carrying and mounting system may provide a number of advantages and benefits over the existing technology. For example, the camera carrying and mounting system may provide the advantage of mounting camera 19 to a variety of different camera stands. For example, bore 4 on camera plate 1, 101 may facilitate mounting of camera 19 to a conventional camera stand having a threaded element (e.g., screw) on its mounting structure. Moreover, the shape and dimensions of camera plate 1, 101 may facilitate mounting of camera 19 to other camera stands including, for example, stands having releasable attachment mounts or clamps 24, such as an Arca-Swiss style attachment mount. It should also be appreciated that the camera carrying and mounting system may obviate the need to take apart components of the system before mounting camera 19 to the camera stand. Rather, camera plate 1, 101 of the camera carrying and mounting system may directly engage the camera stand with the coupling mechanism and strap 8 remaining attached to camera plate 1, 101. This may save valuable time for the user in installing camera 19 on the camera stand as the user prepares for the next photograph.

The camera carrying and mounting system may additionally provide improved handling of camera 19 by the user. For example, by positioning the coupling mechanism on an end of camera plate 1 (and in some embodiments, angled relative to camera plate 1 by way of shoulder 29), the user may grasp the base of camera 19 when taking photographs in a number of orientations, including, for example, a vertical orientation, without interference from the coupling mechanism and/or strap 8. In addition, the ergonomic shape of camera plate 1, 101 may allow the user to securely and comfortably grasp a base of camera 19 (or camera lens 21) when orienting camera 19 for shooting. For example, truncated edge 13 of camera plate 1 may provide improved access and mobility of the user's shooting finger for actuating shutter release button 28 of camera 1, and similarly, truncated edge 14 of camera plate 101 may provide improved access and mobility of the user's active finger for actuating camera lens 21. In addition, tapered portion 15 of camera plate 1, 101 may provide an improved grip of camera plate 1, 101 by better conforming to the shape of the user's hand. The low and flush profile 12 of camera plate 1, 101 may also contribute to the secure and comfortable feel when the user grasps camera plate 1, 101 and camera 19. Along with improved comfort, these features may also reduce user fatigue, and thus may result in steadier handling of camera 19 while taking photographs.

Any aspect set forth in any embodiment may be used with any other embodiment set forth herein. Moreover, the features set forth herein may be used with any suitable carrying structure, such as, for example, a shoulder strap, a belt, bags, purses, backpacks, and the like.

Since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

What is claimed is:

1. A camera carrying and mounting system, comprising:
    a camera plate configured to mount onto a camera, wherein the camera plate includes a first surface facing the camera when mounted onto the camera, a second surface facing away from the camera when mounted onto the camera, and an aperture defined between the first surface and the second surface;
    a carrying structure; and
    a coupling mechanism engaged in the aperture of the camera plate and configured to releasably engage the carrying structure to the camera plate, wherein the camera plate is configured to secure the camera to a camera stand with the coupling mechanism remaining coupled to the camera plate.

2. The system of claim 1, wherein the camera plate is configured to mount onto a base of the camera.

3. The system of claim 1, wherein the camera plate is configured to mount onto a lens of the camera.

4. The system of claim 1, wherein the camera plate further comprises a mounting hole configured to receive a first fastening element to mount the camera plate to the camera.

5. The system of claim 4, wherein the camera plate further comprises a mounting bore configured to receive a second fastening element to mount the camera plate to the camera stand.

6. The system of claim 5, wherein the mounting hole is adjacent to the mounting bore.

7. The system of claim 4, wherein the camera plate further comprises a first end and a second end, wherein the mounting hole is positioned between the first end and the second end.

8. The system of claim 7, wherein the coupling mechanism is coupled to the first end of the camera plate.

9. The system of claim 7, wherein the second end of the camera plate includes a truncated edge, wherein the truncated edge is angled away from the coupling mechanism.

10. The system of claim 7, wherein the second end of the camera plate includes a tapered portion, wherein the tapered portion includes a section of the camera plate decreasing in thickness towards a terminal end of the camera plate.

11. The system of claim 1, wherein the camera plate further comprises one or more bevels on edges of the camera plate, wherein the one or more bevels are configured to engage with the camera stand and secure the camera to the camera stand.

12. The system of claim 4, wherein the first fastening element received within the mounting hole forms a flush interface with the second surface of the camera plate.

13. A camera carrying and mounting system, comprising:
a camera plate configured to mount onto a camera, wherein the camera plate includes a first surface facing the camera when mounted onto the camera, a second surface facing away from the camera when mounted onto the camera, an aperture defined between the first surface and the second surface, a first end, a second end, and a mounting hole configured to receive a first fastening element to mount the camera plate to the camera, wherein the mounting hole is positioned between the first end and the second end of the camera plate; and
a coupling mechanism engaged in the aperture of the camera plate at a first end of the camera plate, wherein the coupling mechanism is configured to releasably engage a carrying structure to the camera plate.

14. The system of claim 13, wherein the camera plate is configured to secure the camera to a camera stand with the coupling mechanism remaining coupled to the camera plate.

15. The system of claim 14, wherein the camera plate further comprises one or more bevels on edges of the camera plate, wherein the one or more bevels are configured to engage with the camera stand and secure the camera to the camera stand.

16. The system of claim 14, wherein the camera plate further comprises a mounting bore configured to receive a second fastening element to mount the camera plate to the camera stand.

17. A camera plate, comprising:
a first end;
a second end;
a mounting structure between the first end and the second end and configured to mount the camera plate to a camera;
a first surface facing the camera when mounted onto the camera;
a second surface facing away from the camera when mounted onto the camera;
an aperture for engaging a coupling mechanism to the camera plate, wherein the aperture is defined between the first surface and the second surface; and
a tapered portion at the first end of the camera plate, wherein the tapered portion includes a section of the camera plate decreasing in thickness towards a terminal end of the camera plate, wherein the camera plate is configured to secure the camera to a camera stand.

18. The camera plate of claim 17, wherein the camera plate further comprises a truncated edge at the first end of the camera plate, wherein the truncated edge is angled away from the second end of the camera plate.

19. The camera plate of claim 17, wherein the camera plate is configured to mount onto a base of the camera.

20. The camera plate of claim 17, wherein the camera plate is configured to mount onto a lens of the camera.

* * * * *